(12) United States Patent
Gordon et al.

(10) Patent No.: US 11,704,775 B2
(45) Date of Patent: *Jul. 18, 2023

(54) BRIGHT SPOT REMOVAL USING A NEURAL NETWORK

(71) Applicant: Spectrum Optix Inc., Vancouver (CA)

(72) Inventors: Kevin Gordon, Edmonton (CA); Martin Humphreys, Sherwood Park (CA); Darcy Daugela, Edmonton (CA); Yeefang Xiao, Edmonton (CA)

(73) Assignee: SPECTRUM OPTIX INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,057

(22) Filed: Aug. 25, 2021

(65) Prior Publication Data

US 2021/0383511 A1  Dec. 9, 2021

Related U.S. Application Data

(63) Continuation of application No. 16/675,603, filed on Nov. 6, 2019, now Pat. No. 11,132,771.

(60) Provisional application No. 62/756,917, filed on Nov. 7, 2018.

(51) Int. Cl.
*G06T 5/00* (2006.01)
*G06T 7/11* (2017.01)
*G06T 3/40* (2006.01)
*H04N 23/71* (2023.01)

(52) U.S. Cl.
CPC ............ *G06T 5/002* (2013.01); *G06T 3/4046* (2013.01); *G06T 5/005* (2013.01); *G06T 7/11* (2017.01); *H04N 23/71* (2023.01); *G06T 2207/10016* (2013.01); *G06T 2207/20081* (2013.01); *G06T 2207/20084* (2013.01); *G06T 2207/20208* (2013.01)

(58) Field of Classification Search
CPC ........ G06T 7/11; G06T 3/4046; H04N 5/2351
See application file for complete search history.

(56) References Cited

U.S. PATENT DOCUMENTS

| 9,589,374 | B1 | 3/2017 | Gao et al. | |
| 11,132,771 | B2* | 9/2021 | Gordon | G06T 5/002 |
| 2017/0262962 | A1* | 9/2017 | Rad | G06T 5/007 |

OTHER PUBLICATIONS

Junjun Jiang et al: "Deep CNN Denoiser and Multi-layer Neighbor Component Embedding for Face Hallucination", arxiv.org, Cornell University Library, 201 Olin Library Cornell University Ithaca, NY 14853, Jun. 28, 2018 (Jun. 28, 2018), XP080895371, paragraph [0001]; figure 2.

* cited by examiner

*Primary Examiner* — Edward Park
(74) *Attorney, Agent, or Firm* — David R. Stevens; Stevens Law Group

(57) ABSTRACT

A method for image capture includes identifying a bright spot in an image. A neural network is used to recover details in bright spot area through a trained de-noising process. Post-processing of the image is conducted to match image parameters of recovered details in the bright spot area to another area of the image.

20 Claims, 7 Drawing Sheets

300

BRIGHT SPOT REMOVAL USING A NEURAL NETWORK

RELATED APPLICATIONS

This application is a continuation of U.S. patent application Ser. No. 16/675,603, filed Nov. 6, 2019, which claims the benefit of U.S. Provisional Application Ser. No. 62/756,917, filed Nov. 7, 2018, which is hereby incorporated herein by reference in its entirety for all purposes.

TECHNICAL FIELD

The present disclosure relates to system for removing bright spots from images using a convolutional neural network. In particular, a method for reducing extended or point source bright spots, reflections, lens flare, and glares is described.

BACKGROUND

Image details can be reduced, contrast reduced, images fogged, large area ghosts created, and picture quality impacted by reflections from sunlight or other bright light sources in or near an image field of view. Daytime glares can often be attributed to reflections off mirror or glass surfaces that reduce details in the vicinity of the reflective object. Night time photography is particularly susceptible to glare around streetlights or other point sources, and even portrait photography can be affected by eyeglass or clothing reflections. Sequential or video images taken by autonomous or semi-autonomous vehicles can also be affected, with headlights from oncoming vehicles or reflections from signs causing details to be "lost in the glare".

A variety of computer processing techniques have been applied reduce glare in image. For example, High Dynamic Range (HDR) imaging can be used to reproduce a greater dynamic range of luminosity than is possible with standard digital imaging or photographic techniques. The techniques typically merge multiple low dynamic range images, each with different exposure times, which has the effect of reducing light saturated bright spots caused by long exposure times.

Other attempts have also been made to improve glare containing images using post-processing. For example, US Patent Publication 20050129324, assigned to Hewlett-Packard, describes repair of a portion of an image that is partially or totally obscured or otherwise rendered undesirable by glare or another optical artifact in the image as captured by the digital camera. According to described embodiment, the flawed portion of the scene containing the artifact is removed and replaced by a corresponding unflawed portion of the scene (i.e., the portion without the artifact) to create the desired image without glare.

Alternatively, specialized sensor masks and hardware can be used to reduce glare. For example, U.S. Pat. No. 7,780,364, assigned to Mitsubishi Electric Research, describes a camera having a lens and a sensor, in which a pin-hole mask is placed in close proximity to the sensor. The mask localizes the glare at readily identifiable pixels, which can then be filtered to produce a glare reduced output image.

In some embodiments, convolutional neural networks can be a part of an imaging system to reduce glare. For example, US Patent Publication 20180039846, assigned to Seeing Machines, Ltd., describes a vision processor is able to 'learn' to disregard glare information and focus instead on the parts of the image that are glare free. A convolutional neural network that may not require the identification of landmark points used, with information such as the degree of eye openness derived directly from the images and the offline training data.

SUMMARY

A method for image capture includes identifying a bright spot in an image. A neural network is used to recover details in bright spot area through a trained de-noising process. Bright spots can be due to at least one of bright source glare, bright source reflections, and optical artifacts. Post-processing of the image is conducted to match image parameters of recovered details in the bright spot area to another area of the image. A fully convolutional neural network with an ability to accept input images of any size can be used.

In one embodiment, a method for image capture includes receiving sensor specific profiling data. A bright spot due to at least one of bright source glare, bright source reflections, and optical artifacts is identified in an image. A neural network based de-noising and the sensor specific profiling data is used to recover details in the bright spot area.

In some embodiments, image segmentation can be used to reduce size of the image requiring neural network based de-noising image. In other embodiments, parameters of recovered details are matched either to areas local to the bright spot area or the entire image.

Applications include still imagery, product photography, portrait photography, or vehicle related imaging. The image can be an HDR image or a video image.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
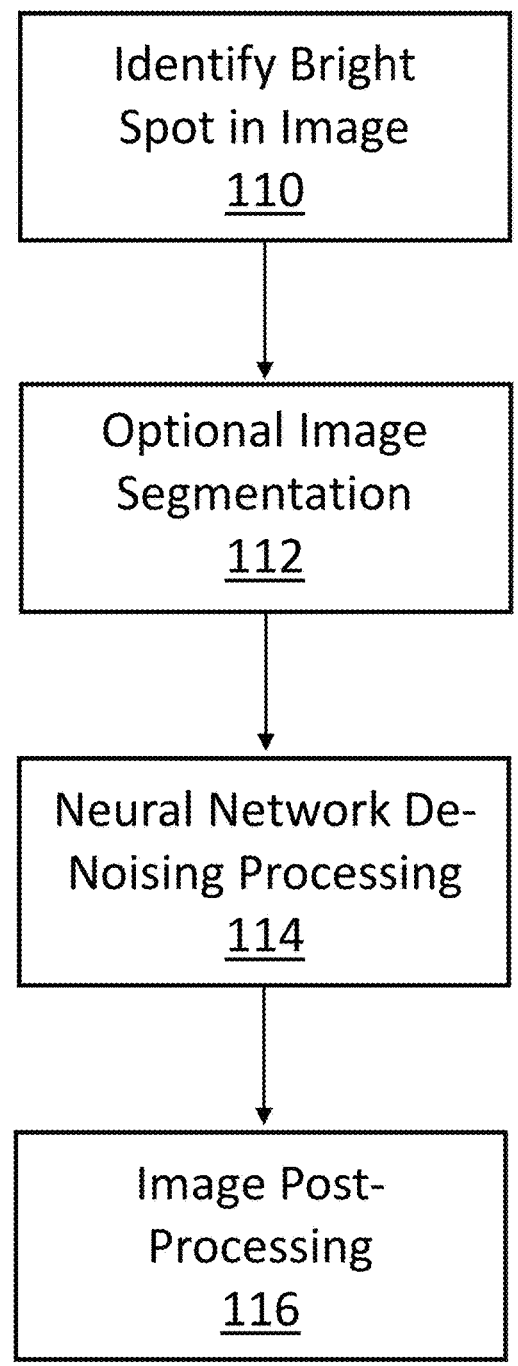
FIG. 1 illustrates a method for reducing glare in images.

Recovery of image detail lost due to bright spots, glare, and noise can result in significant improvement of image quality. Bright spots can be considered as areas of an image where the incoming photons from one light source adversely affect the correct exposure of the photons from another source. Since photon shot noise is proportional to the square root of the intensity of the source of the photons, bright spots create local areas of photon shot noise that can "bury" the signals of surrounding features. In addition to noise contributions, bright spots can increase pixel photon count considerably or completely oversaturate an area of the sensor.

For various reasons it may not be possible nor desirable to obtain an image without the bright spot(s). The following described embodiments provide a system and method able to recover or regenerate an underlying signal from the desired source in the presence of these bright spots. Advantageously, the operating envelope of the sensor is increased and image quality is improved.

In addition to bright spot related noise, all image sensing systems and sensors will have some associated noise that is created during typical operation. In noisy environments such as is common in low light environments (e.g. low environment lux, fast shutter, or small aperture) or high light environments (high environmental lux, slow shutter, large aperture) this noise can become a dominant portion of the digitized signal. Unfortunately, many traditional and modern computer vision algorithms (i.e. object or facial identification, visual odometry, visual SLAM, or image stabilization) can fail in high noise environments. Algorithms and systems that reduce image noise and recover image details are needed to enable these algorithms to work in environments where they would typically fail.

Reducing noise can also benefit machine intelligence based processing of images. Modern learning based algorithms work exceptionally well for those data distribution sets for which they have been trained on. When machine learning algorithms are presented with data outside this distribution, or when using adversarial examples, accuracy, speed, and other performance measures of these algorithms can suffer. If image sensor noise in images or data sets can be greatly reduced, learning algorithms processing the images or data sets will be subject to a lesser performance degradation.

Still another problem with noise is a result of noise being a high entropy information that is nearly incompressible. This means that compression ratios for a given system or sensor storage media will be greatly reduced for images capturing noisy environments or conditions. Compressed file sizes will typically end as much larger than the equivalent signal captured under normal operating conditions.

To reduce noise, improve image accuracy and provide detail recovery due to bright spots, high light conditions, and improve compression ratios, a neural network can be used to recover the underlying signal. In effect, media preprocessed with a system and neural network such as disclosed herein can be improved in image quality and compressed to a greater degree, resulting in smaller file sizes, and reduced storage or bandwidth usage. Advantageously, even correctly exposed images benefit from this preprocessing step.

As seen in FIG. 1, a system and method 100 for improving camera image capture capability relies on first identifying one or more bright spots in an image (step 110). In a second optional step, the image can be segmented, with regions around a bright spot readied for further processing. In a third step, this image (or the bright spot and surrounding region) is processed using neural network or other machine intelligence system to provide de-noising and consequent bright spot reduction. Finally, image postprocessing can be conducted to balance pixel intensity, color, or other image properties to ensure a best match with the rest of the image.

Bright spot identification can be based on the combination of brightness, size, or various radial or linear features. Multiple bright spots can be identified in the image and sequentially processed for bright spot mitigation or removal. In some embodiments, multiple images having bright spots can be used as an input. In other embodiments, different images with different exposure times, different polarization filters, and different wavelengths can be used as inputs. In some embodiments, a neural network can be jointly trained to both identify and reduce bright spots simultaneously. This can be accomplished by crafting a network architecture that has a network output ("network head") with an appropriately crafted objective function that identifies bright spots. Jointly training in this way can have synergetic effects for the bright spot removal task, as well as reduce overall computation by amortizing network parameters over multiple tasks.

Image segmentation is an optional feature that can reduce required image processing time. For example, instead of processing the entire image, only a surrounding region twice the radius of a bright spot can be processed. Alternatively, various sized rectangular bounding boxes centered on a bright spot can be used.

Neural network denoising can be accomplished by training with ground truth images that include synthesized bright spot image simulations. Synthesized bright spots can be created by brightening pixel overlays with various simulated or natural lens flare, glare, starbursts, or other suitable features. In some embodiments, a neural net can be used to create a synthesized bright spot. Such bright spot simulations can have a large variety of configurations including images with lens flare, glare, sun, on-coming head lights, and images including flash lighting features. After training on images with the simulated bright spot, neural network denoising processing is able to produce images testable against ground truth images. Alternatively or in addition to synthetic bright spot simulation, bright spots can be removed by providing two contrasting datasets: one with no bright spots, one with many bright spots. The network must then learn general properties that make up bright spots and also what makes "no bright spot" images, and then learns to remove bright spots such that they more closely imitate examples from the "no bright spot" dataset.

Image post processing can include feature matching that permits replacement of bright spot areas in an image with similar features. In other embodiments, certain bright spot features such as radial spikes can be identified and minimized by pixel randomization or overlays.

A wide range of still or video cameras can benefit from use of system and method 100. Camera types can include but are not limited to conventional DSLRs with still or video capability, smartphone, tablet cameras, or laptop cameras, dedicated video cameras, webcams, or security cameras. In some embodiments, specialized cameras such as infrared cameras, thermal imagers, millimeter wave imaging systems, x-ray or other radiology imagers can be used. Embodiments can also include cameras with sensors capable of detecting infrared, ultraviolet, or other wavelengths to allow for hyperspectral image processing.

Cameras can be standalone, portable, or fixed systems. Typically, a camera includes processor, memory, image sensor, communication interfaces, camera optical and actuator system, and memory storage. The processor controls the overall operations of the camera, such as operating camera optical and sensor system, and available communication interfaces. The camera optical and sensor system controls the operations of the camera, such as exposure control for image captured at image sensor. Camera optical and sensor system may include a fixed lens system or an adjustable lens system (e.g., zoom and automatic focusing capabilities). Cameras can support memory storage systems such as removable memory cards, wired USB, or wireless data transfer systems.

In some embodiments, neural network processing can occur after transfer of image data to a remote computational resources, including a dedicated neural network processing system, laptop, PC, server, or cloud. In other embodiments, neural network processing can occur within the camera, using optimized software, neural processing chips, or dedicated FPGA systems.

In some embodiments, results of neural network processing can be used as an input to other machine learning or neural network systems, including those developed for object recognition, pattern recognition, face identification, image stabilization, robot or vehicle odometry and positioning, or tracking or targeting applications. Advantageously, such neural network processed image normalization can, for example, reduce computer vision algorithm failure in high noise environments, enabling these algorithms to work in environments where they would typically fail due to noise related reduction in feature confidence. Typically, this can include but is not limited to low light environments, foggy, dusty, or hazy environments, or environments subject to light flashing or light glare. In effect, image sensor noise is removed by neural network processing so that later learning algorithms have a reduced performance degradation.

In certain embodiments, multiple image sensors can collectively work in combination with the described neural network processing to enable wider operational and detection envelopes, with, for example, sensors having different light sensitivity working together to provide high dynamic range images. In other embodiments, a chain of optical or algorithmic imaging systems with separate neural network processing nodes can be coupled together. In still other embodiments, training of neural network systems can be decoupled from the imaging system as a whole, operating as embedded components associated with particular imagers.

Figure 2:
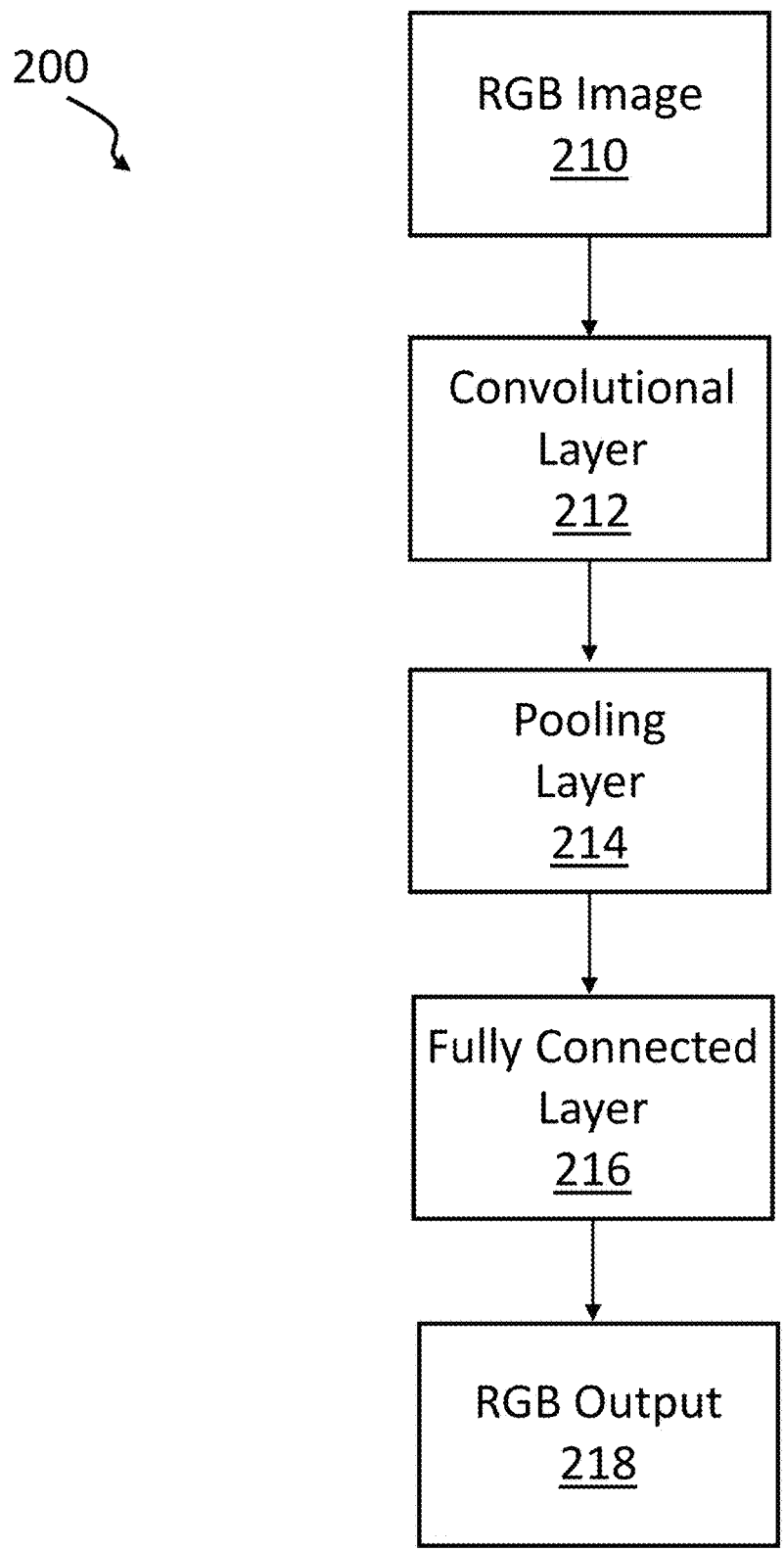
FIG. 2 illustrates neural network processing.

Various types of neural networks can be used, including fully convolutional, recurrent, generative adversarial, or deep convolutional networks. Convolutional neural networks are particularly useful for image processing applications such as described herein. As seen with respect to FIG. 2, a convolutional neural network 200 can receive a single underexposed RGB image 210 as input. RAW formats are preferred, but compressed JPG images can be used with some loss of quality. Images can be pre-processed with conventional pixel operations or can preferably be fed with minimal modifications into a trained convolutional neural network 200.

Processing can proceed through one or more convolutional layers 212, pooling layer 214, a fully connected layer 216, and ends with RGB output 216 of the improved image. In operation, one or more convolutional layers apply a convolution operation to the RGB input, passing the result to the next layer(s). After convolution, local or global pooling layers can combine outputs into a single or small number of nodes in the next layer. Repeated convolutions, or convolution/pooling pairs are possible.

Figure 3:
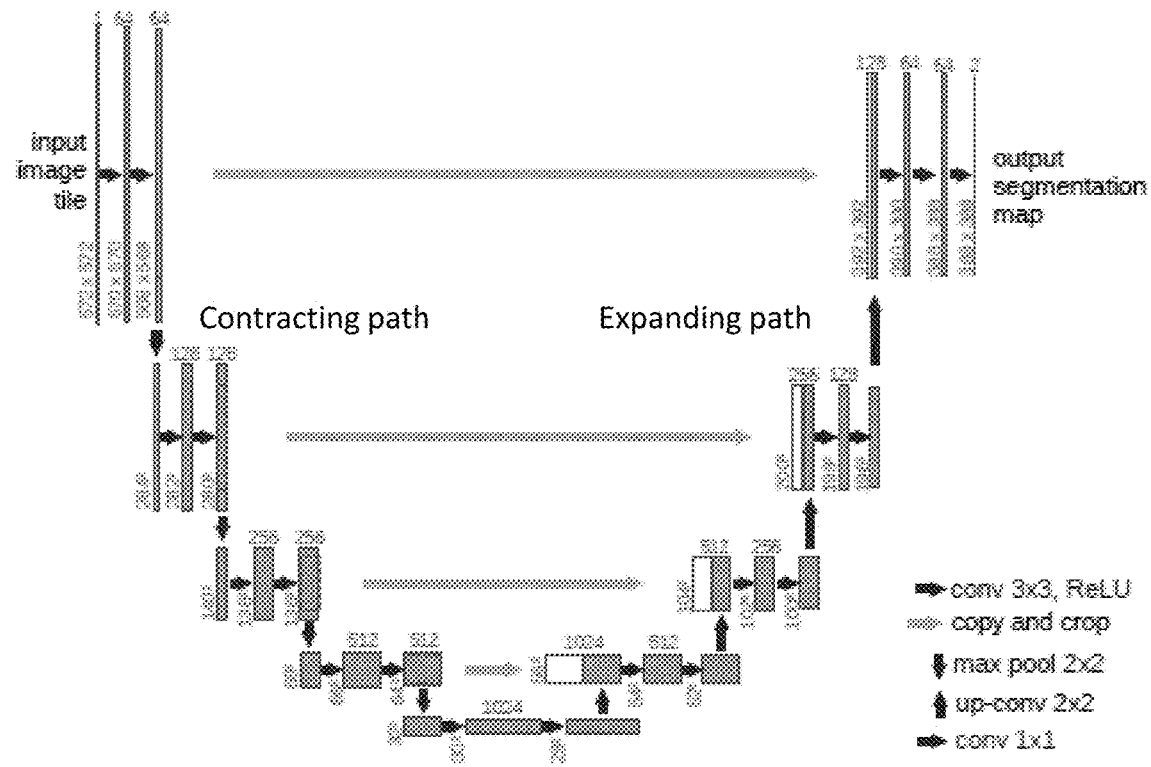
FIG. 3 illustrates an embodiment of a fully convolutional neural network.

One neural network embodiment of particular utility is a fully convolutional neural network. A fully convolutional neural network is composed of convolutional layers without any fully-connected layers usually found at the end of the network. Advantageously, fully convolutional neural networks are image size independent, with any size images being acceptable as input for training or bright spot image modification. An example of a fully convolutional network 300 is illustrated with respect to FIG. 3. Data can be processed on a contracting path that includes repeated application of two 3×3 convolutions (unpadded convolutions), each followed by a rectified linear unit (ReLU) and a 2×2 max pooling operation with stride 2 for down sampling. At each down sampling step, the number of feature channels is doubled. Every step in the expansive path consists of an up sampling of the feature map followed by a 2×2 convolution (up-convolution) that halves the number of feature channels, provides a concatenation with the correspondingly cropped feature map from the contracting path, and includes two 3×3 convolutions, each followed by a ReLU. The feature map cropping compensates for loss of border pixels in every convolution. At the final layer a 1×1 convolution is used to map each 64-component feature vector to the desired number of classes. While the described network has 23 convolutional layers, more or less convolutional layers can be used in other embodiments. Training can include processing input images with corresponding segmentation maps using stochastic gradient descent techniques.

In yet another embodiment, multiple neural networks can be used. For example, generative adversarial neural networks can be used, with one network trained to add synthetic bright spots and an adversarial network trained to remove the bright spots.

The described method and system can provide various benefits for many applications, including:

Still image improvement—Conventional photos can be improved, or certain areas with bright spots can be selected for improvement, with other bright spot features left for aesthetic purposes.

HDR image improvement—Bright spot processing and neural network denoising can be done either before or after combination of short and long exposure images.

Video image improvement—Correction of selected images can be used to guide neural network denoising of subsequent images in the video stream.

Vehicle image processing—Image segmentation can be used to reduce processing time and allow for near real-time recovery of information (such as signage text) that was lost in glare due to vehicle headlights. As another example, bright spot removal can improve a vehicle's imaging system scene classification and object detection.

Mobile device processing—Face recognition and device unlock can be improved in bright or high glare conditions.

Medical imaging—Surgical imaging and/or surgical teleoperation with active illumination within body cavities can be improved by bright spot removal.

Figure 4:
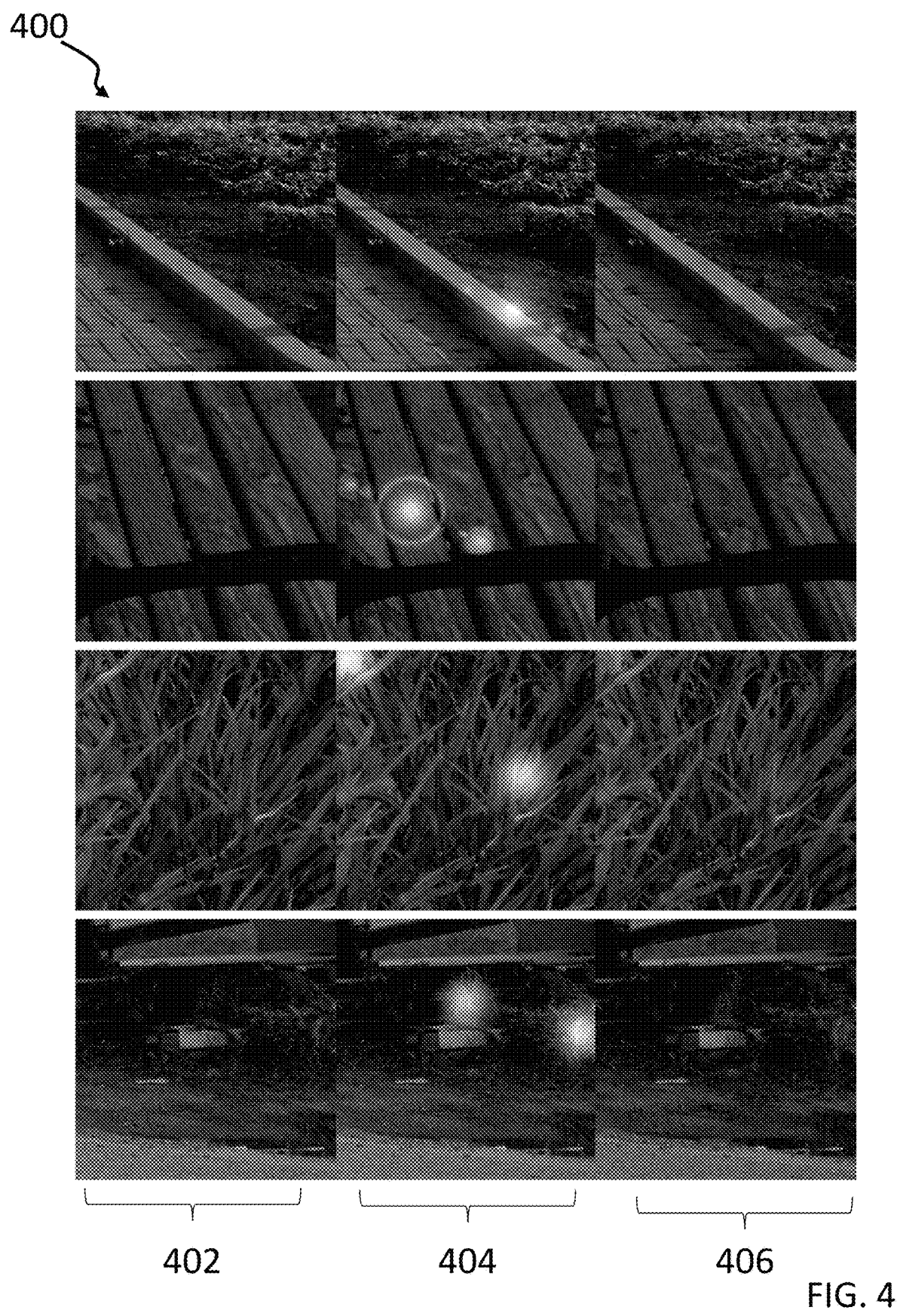
FIG. 4 illustrates representative images with synthetic glare corrected.

FIG. 4 illustrates representative images 400 with synthetic glare corrected. Images 402 are original images. Images 404 have one or more synthetic bright spots added. As is apparent, various types of bright spot size and radial features are shown. Images 406 are corrected by neural network denoising process.

Figure 5:
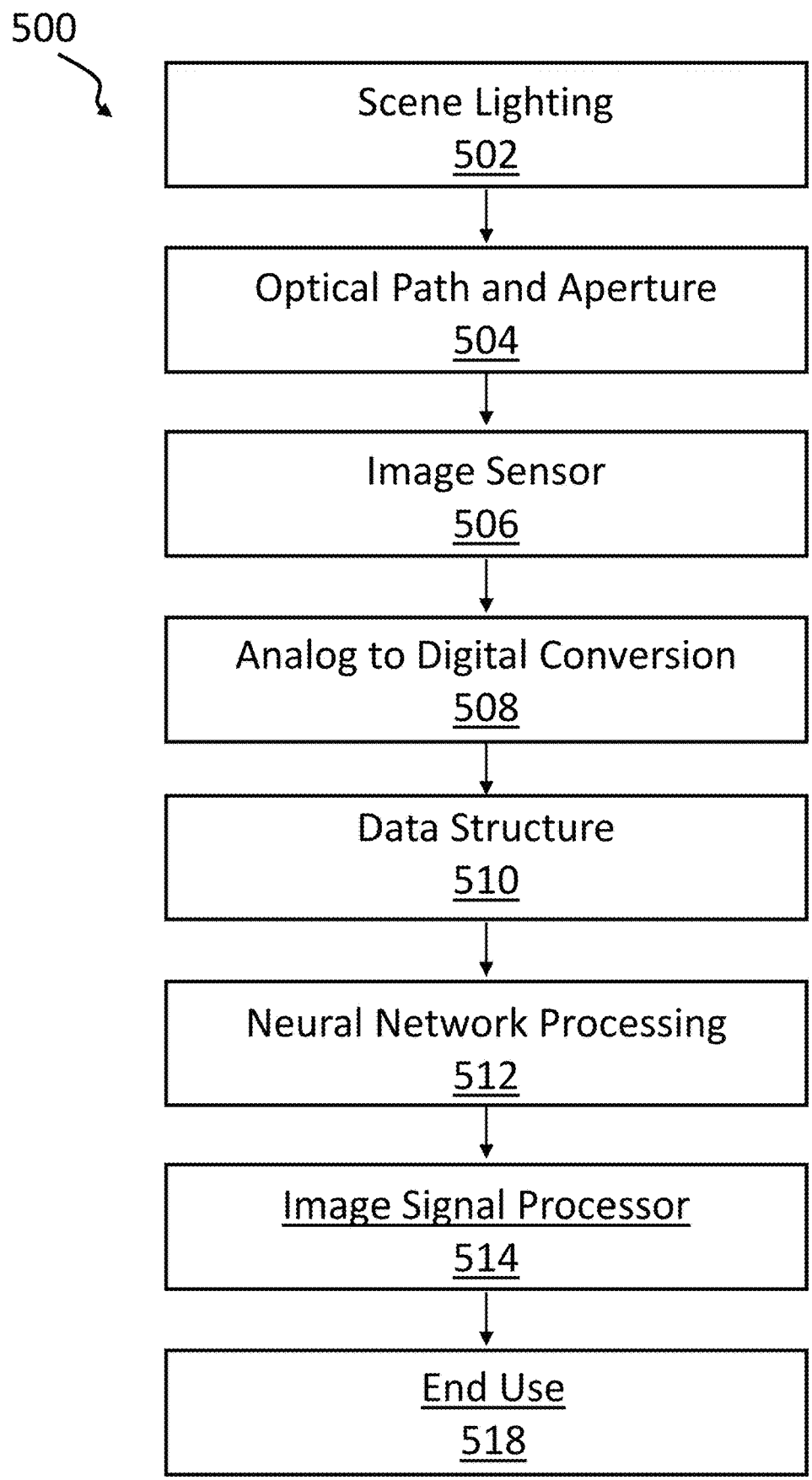
FIG. 5 illustrates on embodiment of a camera sensor processing procedure.

Correcting bright spots or glare features can be done as part of a general imaging pipeline that uses neural networks to improve analog or digital aspects of image data. For example, FIG. 5 illustrates one embodiment of an imaging pipeline 500 for improving image data. Factors that affect analog processing of an image include scene lighting 502, optical path and aperture 504, and features of an image sensor 506. Many of these factors can be automatically adjusted or adjusted to favor factors that will improve efficacy of later neural network processing. For example, flash or other scene lighting can be increased in intensity, duration, or redirected. Filters can be removed from an optical path, apertures opened wider, or shutter speed decreased. Image sensor efficiency or amplification can be adjusted by ISO selection.

In one embodiment, low light images can be captured by increasing one or more of these analog factors prior to analog to digital conversion. Bright spots, glare, noise or other unwanted artifacts can be removed by later neural network processing 512 after analog to digital conversion 508 and conversion into a suitable data structure 510 such as Bayer derived, RGB, RAW, TIFF, JPG, or the like. For example, a Bayer derived data structure could be defined to stack the color channels depthwise, such that the resulting dimensions are halved spatially and quadrupled depthwise.

Image signal processing using an image signal processor 514 can include additional digital scaling, tone mapping, pixel correction, demosaicing, dehazing, or the like. In some embodiments, neural network processing can run on the image signal processor 514, while in others a separate processing component can be used. A processed image can be stored, transferred, displayed, classified, encoded, or provided for any other suitable intermediate or end use 518.

Figure 6:
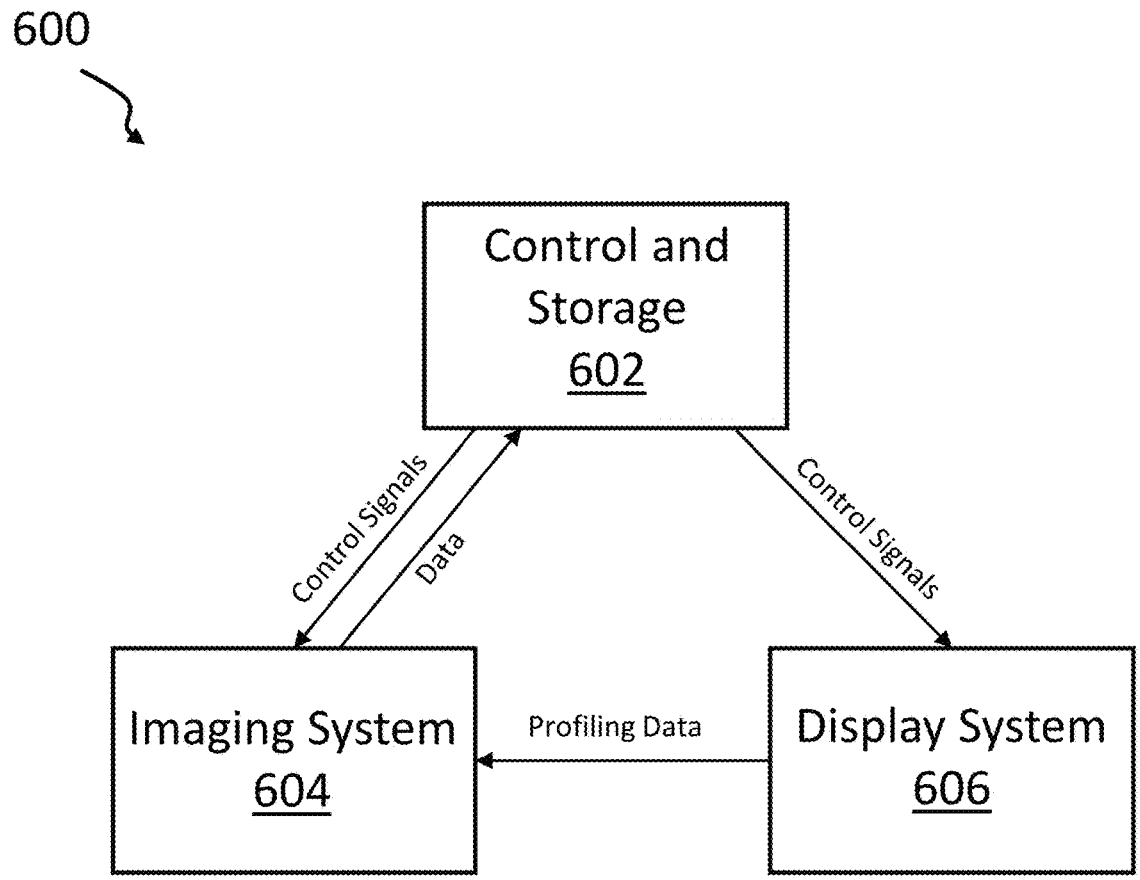
FIG. 6 illustrates a system with control, imaging, and display sub-systems.

FIG. 6 illustrates a system 600 for training neural networks suitable for bright spot or glare removal, as well as general analog and digital image processing. A control and storage module 602 able to send respective control signals to an imaging system 604 and a display system 606 is provided. The imaging system 604 can supply processed image data to the control and storage module 602, while also receiving profiling data from the display system 606.

Training neural networks in a supervised or semi-supervised way requires high quality training data. To obtain such data, the system 600 provides automated imaging system profiling. The control and storage module 602 contains calibration and raw profiling data to be transmitted to the display system 606. Calibration data may contain, but is not limited to, targets for assessing resolution, focus, or dynamic range. Raw profiling data may contain, but is not limited to, natural and manmade scenes captured from a high quality imaging system (a reference system), and procedurally generated scenes (mathematically derived).

An example of a display system 606 is a high quality electronic display. The display can have its brightness adjusted or may be augmented with physical filtering elements such as neutral density filters. An alternative display system might comprise high quality reference prints or filtering elements, either to be used with front or back lit light sources. In any case, the purpose of the display system is to produce a variety of images, or sequence of images, to be transmitted to the imaging system.

The imaging system being profiled is integrated into the profiling system such that it can be programmatically controlled by the control and storage computer and can image the output of the display system. Camera parameters, such as aperture, exposure time, and analog gain, are varied and multiple exposures of a single displayed image are taken. The resulting exposures are transmitted to the control and storage computer and retained for training purposes.

The entire system is placed in a controlled lighting environment, such that the photon "noise floor" is known during profiling.

The entire system is setup such that the limiting resolution factor is the imaging system. This is achieved with mathematical models which take into account parameters, including but not limited to: imaging system sensor pixel pitch, display system pixel dimensions, imaging system focal length, imaging system working f-number, number of sensor pixels (horizontal and vertical), number of display system pixels (vertical and horizontal). In effect a particular sensor, sensor make or type, or class of sensors can be profiled to produce high-quality training data precisely tailored to an individual sensors or sensor models.

Figure 7:
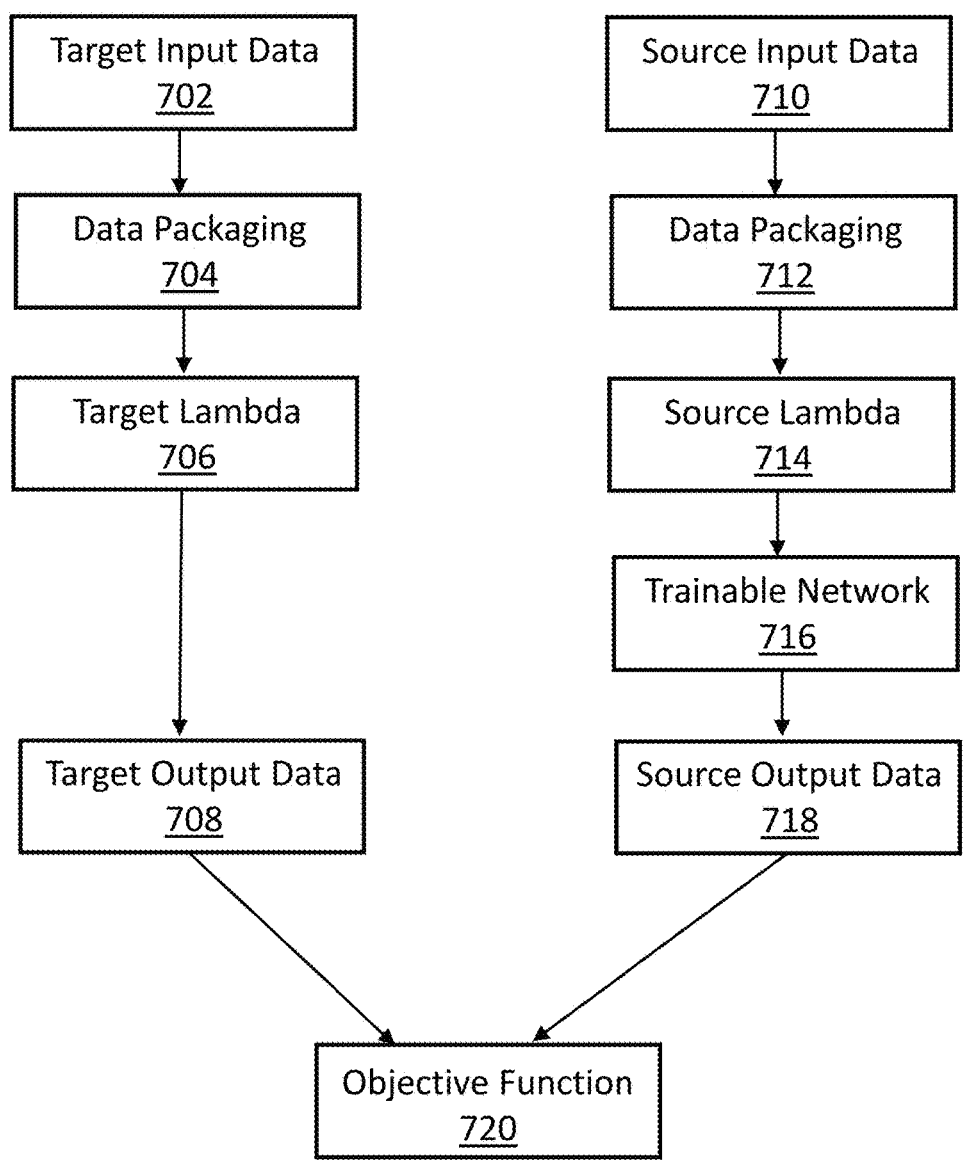
FIG. 7 illustrates one embodiment of a neural network training procedure.

FIG. 7 illustrates one embodiment of a neural network system 700 whose parameters can be manipulated such that they produce desirable outputs for a set of inputs and are capable of improving imaging quality for noisy or bright-spot image data such as previously described. One such way of manipulating a network's parameters is by "supervised training". In supervised training, the operator provides source/target pairs 710 and 702 to the network and, when combined with an objective function, can modify some or all the parameters in the network system 700 according to some scheme (e.g. backpropagation).

In the described embodiment of FIG. 7, high quality training data (source 710 and target 702 pairs) from various sources such as a profiling system, mathematical models and publicly available datasets, are prepared for input to the network system 700. The method includes data packaging target 704 and source 712, and preprocessing lambda target 706 and source 714.

Data packaging takes one or many training data sample(s), normalizes it according to a determined scheme, and arranges the data for input to the network in a tensor. Training data sample may comprise sequence or temporal data.

Preprocessing lambda allows the operator to modify the source input or target data prior to input to the neural network or objective function. This could be to augment the data, to reject tensors according to some scheme, to add synthetic noise or bright-spots to the tensor, to perform warps and deformation to the data for alignment purposes or convert from image data to data labels.

The network 716 being trained has at least one input and output 718, though in practice it is found that multiple outputs, each with its own objective function, can have synergetic effects. For example, though the overall objective of the system is to reduce the presence of bright spots, bright spot removal performance can be improved through a "classifier head" output whose objective is to classify objects in the tensor. Target output data 708, source output data 718, and objective function 720 together define a network's loss to be minimized, the value of which can be improved by additional training or data set processing. Alternatively or in addition, in some embodiments, a neural network can be jointly trained to both identify and reduce bright spots simultaneously. This can be accomplished by crafting a network architecture that has a network output ("network head") with an appropriately crafted objective function that identifies bright spots.

As will be understood, the camera system and methods described herein can operate locally or in via connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Connection to remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A system for image capture comprising:
a neural network processing system configured to:
identify at least one bright spot within a digital photograph; and
process the digital photograph to recover detail in a first area of the digital photograph that contains the at least one bright spot by performing a de-noising process using a fully convolutional neural network.

2. The system of claim 1, wherein the neural network processing system is further configured to use image segmentation to reduce a size of a portion of the digital photograph to which the de-noising process is applied.

3. The system of claim 2, wherein the neural network processing system is configured such that the size of the portion is only twice a radius of the at least one bright spot.

4. The system of claim 1, wherein the neural network processing system is further configured to:
perform post-processing in which at least one image parameter of the detail in the first area is matched to a corresponding parameter of a second area of the digital photograph.

5. The system of claim 1, wherein the fully convolutional neural network is trained to process digital photographs of any size.

6. The system of claim 1, further comprising a camera, the neural network processing system configured to receive the digital photograph from the camera.

7. The system of claim 6, wherein the camera is part of a vehicle imaging system.

8. The system of claim 7, wherein the vehicle imaging system is configured to recover information from the digital photograph.

9. The system of claim 8, wherein the information is signage information.

10. The system of claim 1, further comprising a surgical imaging and teleoperation system with active illumination.

11. The system of claim 1, further comprising an imaging device configured to generate the digital photograph with the at least one bright spot.

12. The system of claim 11, wherein the imaging device comprises an aperture having a width effective to generate the at least one bright spot.

13. The system of claim 11, wherein the imaging device is configured with a shutter speed decreased to be effective to generate the at least one bright spot.

14. The system of claim 11, further comprising a lighting device configured to generate the at least one bright spot.

15. The system of claim 1, wherein the fully convolutional neural network is configured to both identify the at least one bright spot and recover the detail in the first area of the digital photograph that contains the at least one bright spot.

16. The system of claim 1, wherein the neural network processing system is configured to receive the digital photograph as part of a digital video.

17. The system of claim 1, wherein the digital photograph is a high dynamic range (HDR) image.

18. The system of claim 1, wherein the digital photograph is a red green blue (RGB) image.

19. The system of claim 1, wherein the fully convolutional neural network comprises:
a plurality of first pairs of 3×3 convolutions each followed by a first rectified linear unit and a 2×2 max pooling operation with stride 2; and
a plurality of second pairs of 3×3 convolutions followed by 2×2 up-convolution and a second rectified linear unit.

20. The system of claim 1, wherein the fully convolutional neural network is trained as part of a generative adversarial network including a network trained to add synthetic bright spots.

* * * * *